US012637139B2

(12) United States Patent
Rahimzai

(10) Patent No.: US 12,637,139 B2
(45) Date of Patent: May 26, 2026

(54) HYDRAULIC STEERING ARRANGEMENT

(71) Applicant: Danfoss Power Solutions ApS,
Nordborg (DK)

(72) Inventor: Abdul Karim Rahimzai, Sønderborg
(DK)

(73) Assignee: **DANFOSS POWER SOLUTIONS
APS**, Nordborg (DK)

( * ) Notice: Subject to any disclaimer, the term of this
patent is extended or adjusted under 35
U.S.C. 154(b) by 423 days.

(21) Appl. No.: 18/356,830

(22) Filed: Jul. 21, 2023

(65) Prior Publication Data

US 2024/0034396 A1 Feb. 1, 2024

(30) Foreign Application Priority Data

Jul. 28, 2022 (EP) .................................... 22187380

(51) Int. Cl.
| | |
|---|---|
| *B62D 5/065* | (2006.01) |
| *B62D 5/07* | (2006.01) |
| *B62D 5/087* | (2006.01) |

(52) U.S. Cl.
CPC ............... *B62D 5/065* (2013.01); *B62D 5/07*
(2013.01); *B62D 5/087* (2013.01)

(58) Field of Classification Search
CPC ........... B62D 5/093; B62D 5/062; B62D 5/30
(Continued)

(56) References Cited

U.S. PATENT DOCUMENTS

| | | |
|---|---|---|
| 3,931,711 A | 1/1976 | Rau et al. |
| 4,620,416 A | 11/1986 | Yip et al. |

(Continued)

FOREIGN PATENT DOCUMENTS

| | | |
|---|---|---|
| DE | 102018125051 A1 | 4/2020 |
| DK | 270883 A | 12/1983 |

(Continued)

*Primary Examiner* — Valentin Neacsu
*Assistant Examiner* — Hosam Shabara
(74) *Attorney, Agent, or Firm* — McCormick, Paulding &
Huber PLLC

(57) ABSTRACT

A hydraulic steering arrangement (1) is disclosed. The hydraulic steering arrangement (1) includes a supply port arrangement (P, T) having a pressure port (P) and a tank port (T), a working port arrangement having two working ports (L, R), a main flow path (2) having a main orifice ($A_1$) and at least one further orifice ($A_2, A_3, A_4$) downstream the main orifice ($A_1$), the main flow path (2) being arranged between the pressure port (P) and the working port arrangement (L, R), a return flow path (4) arranged between the working port arrangement (L, R) and the tank port (T), a measuring motor (3), an amplification flow path (6) having an amplification orifice (AU) and being arranged between the pressure port (P) and the working port arrangement (L, R), and an adjustable pressure source (9) connected to the pressure port (P) and having a load sensing port (18), wherein a main drain orifice ($A_{drain}$) is connected between the main flow path (2) down-stream the main orifice ($A_1$) and the return flow path (4). Such a steering arrangement should have the possibility of dynamic steering with a simple construction. To this end a dynamic main orifice ($A_{1-dyn}$) is connected between the load sensing port (18) and the main flow path (2) down-stream the main orifice ($A_1$), and a dynamic drain orifice (Adrain-dyn) is connected between the load sensing port (18) and the return flow path (4), which dynamic drain orifice (Adrain-dyn) is open when the dynamic main orifice (A1-dyn) is closed.

18 Claims, 2 Drawing Sheets

(58) Field of Classification Search
USPC .......................................................... 180/421
See application file for complete search history.

(56)                        References Cited

U.S. PATENT DOCUMENTS

| 7,185,730 | B2 | | 3/2007 | Schmidt et al. | |
|---|---|---|---|---|---|
| 2014/0298792 | A1 | * | 10/2014 | Andersen | B62D 5/093 |
| | | | | | 60/433 |
| 2020/0114954 | A1 | | 4/2020 | Rahimzai | |
| 2020/0114956 | A1 | * | 4/2020 | Rahimzai | B62D 5/062 |

FOREIGN PATENT DOCUMENTS

| EP | 2 786 915 | A1 | 10/2014 |
|---|---|---|---|
| EP | 4311741 | A1 | 1/2024 |

\* cited by examiner

HYDRAULIC STEERING ARRANGEMENT

CROSS-REFERENCE TO RELATED APPLICATION

This application claims foreign priority benefits under 35 U.S.C. § 119 from European Patent Application No. 22187380.5, filed Jul. 28, 2022, the content of which is hereby incorporated by reference in its entirety.

TECHNICAL FIELD

The present invention relates to a hydraulic steering arrangement comprising a supply port arrangement having a pressure port and a tank port, a working port arrangement having two working ports, a main flow path having a main orifice and at least one further orifice downstream the main orifice, the main flow path being arranged between the pressure port and the working port arrangement, a return flow path arranged between the working port arrangement and the tank port, a measuring motor, an amplification flow path having an amplification orifice and being arranged between the pressure port and the working port arrangement, and an adjustable pressure source connected to the pressure port and having a load sensing port, wherein a main drain orifice is connected between the main flow path downstream the main orifice and the return flow path.

BACKGROUND

Such a hydraulic steering arrangement is known, for example, from US 2020/0114954 A1. In a neutral position all orifices in the main flow path and the amplification orifice are closed, wherein the main drain orifice is totally open. Hydraulic fluid from the load sensing port of the pressure source is directed to the tank port. As the flow from the load sensing port of the pressure source flows always to a tank port, steering will start as soon as the main orifice and the amplification orifice open. At this moment, the main drain orifice is totally closed.

SUMMARY

The object underlying the invention is to have the possibility of dynamic steering with a simple construction.

This object is solved with a hydraulic steering arrangement as described at the outset in that a dynamic main orifice is connected between the load sensing port and the main flow path downstream the main orifice and a dynamic drain orifice is connected between the load sensing port and the return flow path, which dynamic drain orifice is open when the dynamic main orifice is closed.

In such a construction it is possible to use the flow from the load sensing port of the adjustable pressure source for steering. This flow, which is also called "dynamic flow" is not wasted but is used for steering. The dynamic main orifice allows a dynamic flow from the load sensing port of the adjustable pressure source to tank in the neutral position when all other orifices (possibly except the main drain orifice) are closed.

In an embodiment of the invention the dynamic main orifice opens before the main orifice opens. This means, that the dynamic flow can be used for steering at small angles of rotation of the steering wheel or any other steering command device. The driver can effect a slow steering in which only the smaller dynamic flow is used, and not the flow through the main orifice in the main flow path.

In an embodiment of the invention the dynamic main orifice is connected to the main flow path between the main orifice and a measuring motor orifice. This means that even the dynamic flow is controlled by the measuring motor and drives the measuring motor, so that the measuring motor can be used to stop steering once the required steering angle of the steering motor has been reached.

In an embodiment of the invention a dynamic amplification orifice is connected between the load sensing port and the main flow path downstream the measuring motor. Even when steering using the dynamic flow, an amplification factor can be used, so that the flow supplied to the steering motor can be increased as well and the action required by the driver, for example for rotating the steering wheel, can be kept small. Since the dynamic amplification orifice is connected to the main flow path downstream the measuring motor, the dynamic flow which is guided through the dynamic amplification orifice is kept outside the measuring motor.

In an embodiment of the invention the dynamic amplification orifice opens before the amplification orifice opens. This means that steering can already start before the main orifice and the amplification orifice open.

In an embodiment of the invention an opening degree of the dynamic main orifice is proportional to an opening degree of the dynamic amplification orifice. Thus, the dynamic flow passing the dynamic amplification orifice is proportional to the flow passing the dynamic main orifice. In this way a constant amplification factor can be established for the whole working range of the hydraulic steering arrangement.

In an embodiment of the invention a safety valve is arranged between the dynamic amplification orifice and the main flow path. The safety valve can throttle the flow delivered through the amplification orifice and the dynamic amplification orifice in dependence of a pressure generated by the flow passing the main orifice and the dynamic main orifice. Furthermore, the safety valve can be used to stop supply of flow to the working port arrangement when the main flow path downstream the main orifice is blocked.

In an embodiment of the invention at least some of the orifices are formed by an arrangement of a spool and a sleeve, wherein the dynamic main orifice and the dynamic amplification orifice are connected by means of a ring channel arranged in the sleeve. The ring channel can, for example, connect the two dynamic orifices to the load sensing port of the adjustable pressure source.

In an embodiment of the invention the dynamic drain orifice is connected to the ring channel. This means that the ring channel is used as collecting point for all orifices which are used for dynamic steering. This makes the construction simple.

In an embodiment of the invention a relation between an opening degree of the main orifice and an opening degree of the amplification orifice changes with an actuation speed of a steering command device. When the steering command device is, for example, a steering wheel, then the relation between the opening degrees of the main orifice and the amplification orifice changes with the rotational speed of the steering wheel. This means, that the amplification achieved by the amplification orifice varies with the rotational speed of the steering wheel (or any other actuation speed of the steering command device).

BRIEF DESCRIPTION OF THE DRAWINGS

A preferred embodiment of the invention will now be described with reference to the drawing, in which.

DETAILED DESCRIPTION

Figure 1:
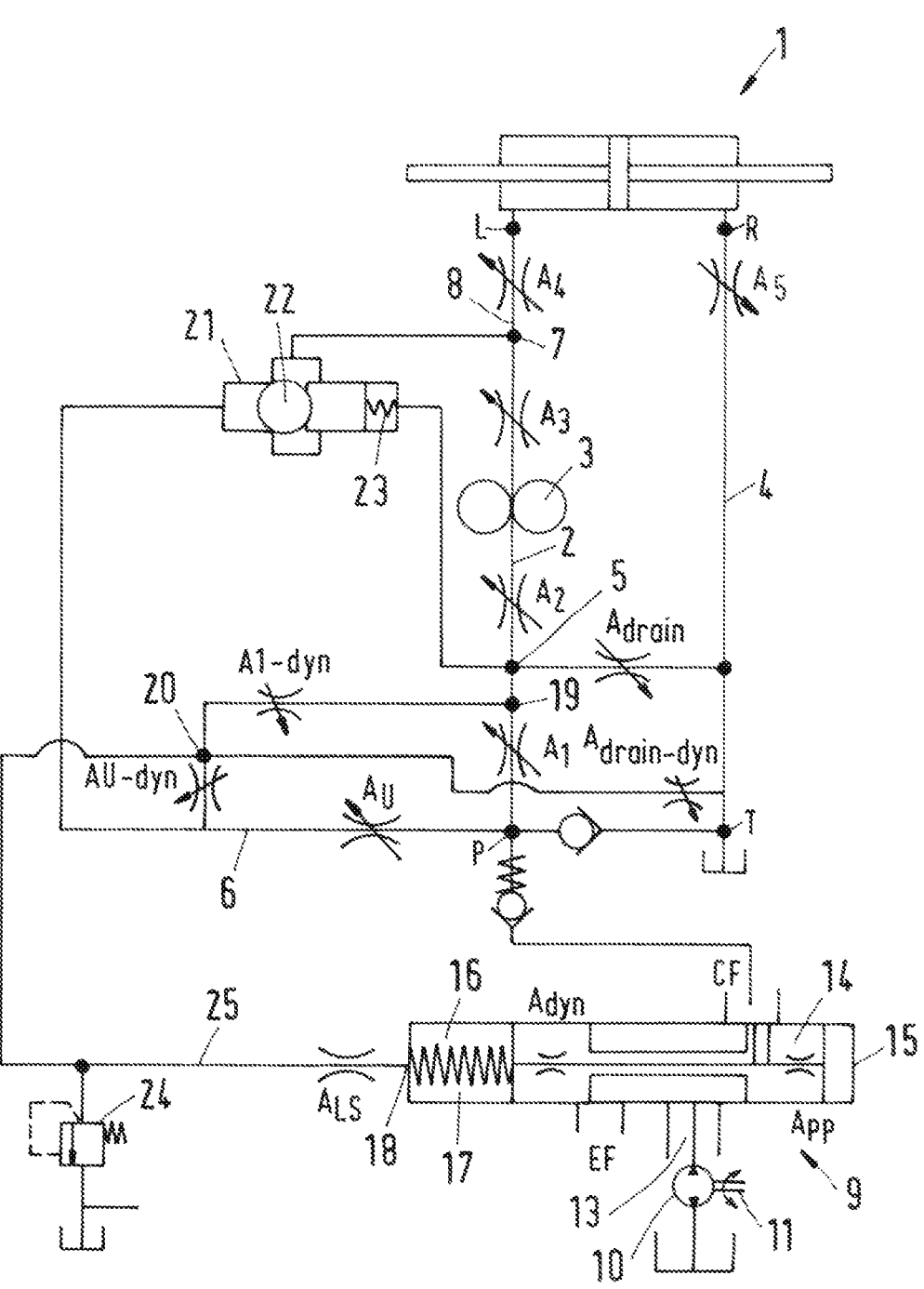
FIG. 1 shows a schematic illustration of a hydraulic steering arrangement.

A hydraulic steering arrangement 1 comprises a supply port arrangement having a pressure port P and a tank port T. Furthermore, the steering arrangement 1 comprises a working port arrangement having a left working port L and a right working port R. A main flow path 2 is arranged between the pressure port P and the working port arrangement L, R. It depends on the direction of steering which of the two working ports L, R is connected to the main flow path 2.

The main flow path 2 comprises a main orifice A1 and a measuring motor 3. A first measuring motor orifice A2 is arranged upstream the measuring motor 3 and a second measuring motor orifice A3 is arranged downstream the measuring motor 3. The terms "upstream" and "downstream" are related to the direction of flow from the pressure port P to the working port arrangement L, R.

A return flow path 4 is arranged between the working port arrangement L, R and the tank port T. Again, it depends on the direction of steering which of the working ports L, R is connected to the return flow path 4.

Hydraulic fluid passing through the main flow path 2 is supplied to one of the working ports L, R via a working port orifice A4 and hydraulic fluid returning through the other working port R, L flows through a further working port orifice A5 into the return flow path 4. Again, it depends on the direction of steering which of the working port orifices A4, A5 is used for the supply flow and the return flow.

A main drain orifice Adrain is arranged between a point 5 in the main flow path 2, and the return flow path 4. The point 5 is arranged downstream the main orifice A1 and upstream the first measuring motor orifice A2.

The steering arrangement 1 comprises furthermore an amplification flow path 6 having an amplification orifice AU. The amplification flow path 6 is arranged between the pressure port P and the working port arrangement L, R. The amplification flow path 6 is connected to the main flow path 2 at a point 7 between the second measuring motor orifice A3 and the working port orifice A4. The working port orifices A4, A5 are dimensioned such that they can take over the combined flow of the main flow path 2 and the amplification flow path 6.

Figure 2:
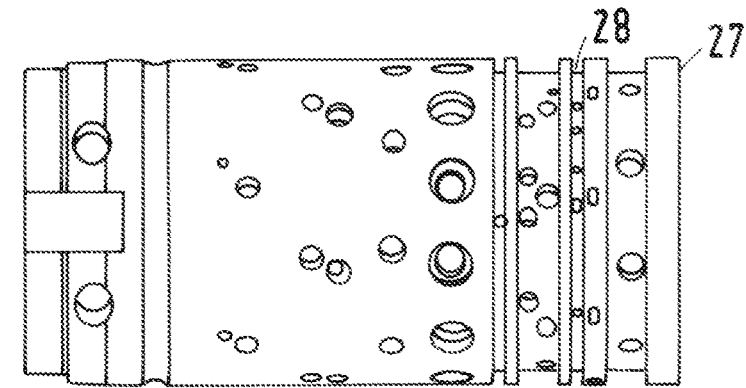
FIG. 2 a sleeve of a steering unit.
Figure 3:
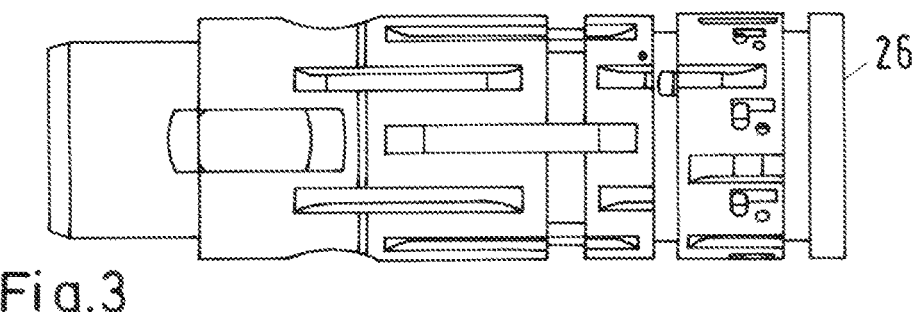
FIG. 3 a spool of the steering unit.

The orifices A1-A5, AU and Adrain are formed, for example, in a spool/sleeve set in which a spool 26 and a sleeve 27 (FIGS. 2 and 3) are arranged rotatably with respect to each other. One of the spool 26 and sleeve 27 is connected to a steering wheel (not shown) and the other is connected to the measuring motor 3. Spool 26 and sleeve 27 together define the mentioned orifices. When the spool 26 is rotated with respect to the sleeve (27), the main drain orifice Adrain starts throttling, i.e. the flow area of the main drain orifice Adrain is decreased. Upon further rotation of the spool 26 with respect to the sleeve 27, i.e. with increasing deflection between spool 26 and sleeve 27, the orifices A2-A5 and AU start opening and allow hydraulic fluid to flow from the pressure port P to one of the working ports L, R. This flow drives the measuring motor 3. The measuring motor 3 is operatively connected to the other part of the spool/sleeve set which is not connected to the steering wheel and rotates it back to the initial position once the required amount of hydraulic fluid has been supplied to the working port arrangement.

The main orifice A1 and the amplification orifice AU start opening at the same angle of the steering wheel, however, only after the main drain orifice Adrain has started throttling. The opening degrees of the main orifice A1 and of the amplification orifice AU may be proportional to each other. The proportion defines the amplification factor which should be obtained by using the amplification flow path 6. When, for example the opening degree of the amplification orifice AU increases faster than the opening degree of the main orifice A1, more than 100% of the fluid passing through the main flow path 2 passes through the amplification flow path 6 except a section 8 between the point 7 and the working port L.

Figure 4:
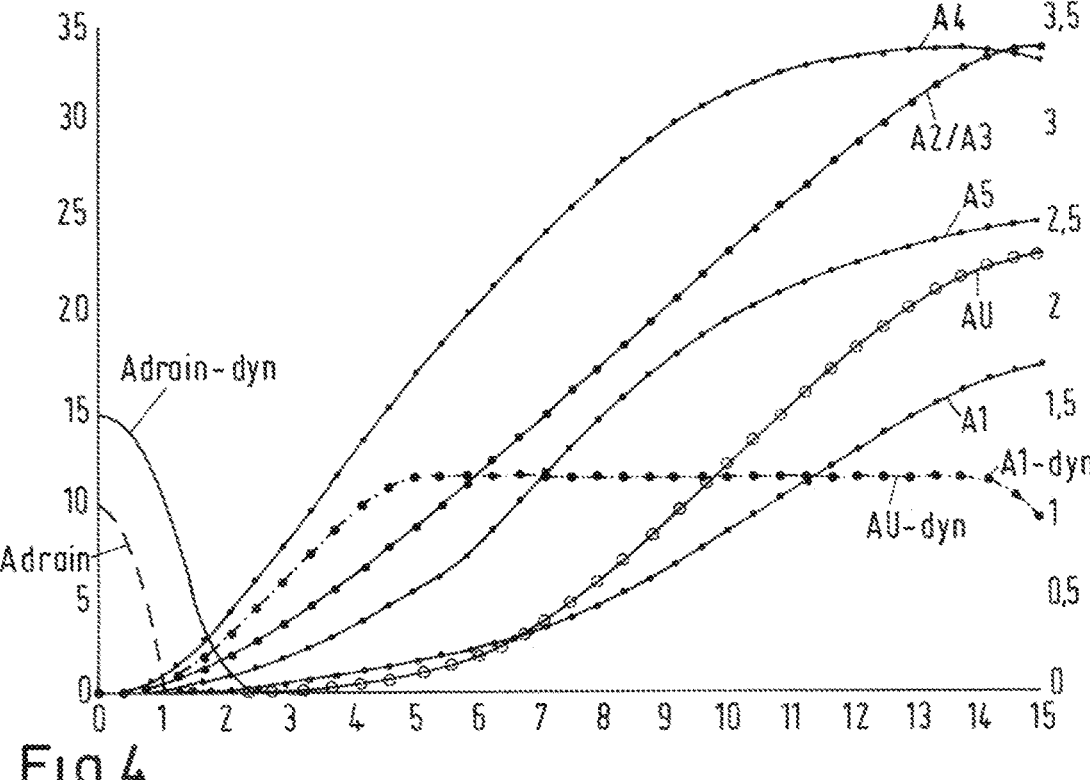
FIG. 4 curves showing the opening degrees of orifices of the steering arrangement depending on the angular deflection between spool and sleeve.

FIG. 4 shows the opening degrees of the respective orifices depending on the deflection between spool 26 and sleeve 27. This deflection depends on the rotting speed of the steering wheel. The higher the rotating speed of the steering wheel, the larger is the deflection.

It can be seen that in the embodiment shown in FIG. 4 the opening degrees of the main orifice A1 and of the amplification orifice AU are not proportional to each other. This means, that the amplification factor varies with the deflection between spool 26 and sleeve 27 and thus varies with the rotational speed of the steering wheel.

Furthermore, it should be noted that in the embodiment shown in FIG. 4 the dynamic main orifice A1-dyn and the dynamic amplification orifice AU-dyn open basically proportional to each other. The opening degrees of these two orifices A1-dyn and AU-dyn is the same for all angles of deflection. However, it is also possible to use a non-proportional relation between the opening degrees of the dynamic orifices.

The steering arrangement 1 comprises an adjustable pressure source 9. The pressure source 9 comprises a pump 10 which can have a fixed displacement, and which is driven via a shaft 11 by a motor or engine of the vehicle to be steered.

The pump 10 is connect to an input 13 of a priority valve 12. The priority valve 12 comprises a piston 14 which is arranged between a pressure chamber 15 and a spring chamber 16. A spring 17 is arranged in the spring chamber 16.

The priority valve 12 comprises a priority output CF and a further output EF which can be connected to additional hydraulic equipment, not shown.

The priority output CF is connected to the pressure chamber 15 via an orifice APP. It is furthermore connected to the spring chamber 16 via a dynamic orifice Adyn. The piston 14 assumes a position in which a force generated by the pressure difference between the pressure chamber 15 and the spring chamber 16 is in equilibrium with the force of the spring 17.

The priority valve 12 comprises a load sensing port 18 which is connected to a load sensing orifice ALS. The load sensing port 18 is connected via the load sensing orifice ALS, which is a fixed orifice, and a dynamic main orifice A1-dyn to the main flow path 2 at a point 19 downstream the main orifice A1. Point 19 can be the same as point 5. The dynamic main orifice A1-dyn opens before the main orifice A1 opens. The dynamic main orifice A1-dyn is connected to the main flow path 2 between the main orifice A1 and the measuring motor orifice A2.

The load sensing port 18 of the adjustable pressure source 9 is connected via the load sensing orifice ALS and a dynamic amplification orifice AU-dyn to the amplification flow path 6 and via the amplification flow path 6 to the point 7 in the main flow path 2. The dynamic amplification orifice AU-dyn opens before the amplification orifice AU opens.

As mentioned above, the opening degree of the dynamic main orifice A1-dyn is proportional to an opening degree of the dynamic amplification orifice AU-dyn. This means that as long as the main orifice A1 and the amplification orifice AU are closed, the dynamic flow from the load sensing port 18 is proportionally divided and supplied to the measuring motor 3 via the main flow path 2 and to the point 7 via the amplification flow path 6. The load sensing port 18 is connected to a point 20 between the dynamic main orifice A1-dyn and the dynamic amplification orifice AU-dyn. Point 20 is connected to the tank port T via a dynamic drain orifice Adrain-dyn. The dynamic drain orifice Adrain-dyn is open when the dynamic main orifice A1-dyn and the dynamic amplification orifice AU-dyn are closed.

Point 20 can be arranged in a ring channel 28 (FIG. 2) of the sleeve 27. This ring channel 28 can be connected to the load sensing port 18 of the adjustable pressure source 9.

A safety valve 21 is arranged in the amplification flow path 6. The safety valve 21 comprises a valve element 22, for example in form of a ball, which is loaded in opening direction with the pressure in the amplification flow path 6 and in closing direction by the force of a spring 23 and a pressure at point 5 in the main flow path 2 downstream the main orifice A1.

When no steering is intended, the steering arrangement is in neutral. When in neutral, all orifices in the main flow path 2 and the amplification orifice AU are closed. Furthermore, the dynamic main orifice A1-dyn and the dynamic amplification orifice AU-dyn are closed as well and the dynamic drain orifice Adrain-dyn is open and thus directs dynamic flow from the load sensing port 18 of the pressure source 9 to tank T.

When the driver moves the steering wheel (not shown) or any other steering command device only by a small angle, for example, when starting steering, the dynamic main orifice A1-dyn and the dynamic amplification orifice AU-dyn open. In this case, there is only a small angular deflection between spool 26 and sleeve 27. The dynamic drain orifice Adrain-dyn is still open, however, starts throttling. Thus, dynamic flow from the load sensing port 18 can be used to produce a supply of hydraulic fluid to the working port arrangement L, R. One part of the hydraulic flow is supplied through the main flow path 2 and passes the measuring motor 3, so that steering can be terminated once the desired steering angle has been reached. The other part of the dynamic flow passes the dynamic amplification orifice AU-dyn and is supplied via the safety valve 21 to the point 7 between the measuring motor orifice A3 and the working port orifice A4. The flow rate through the dynamic amplification orifice AU-dyn will be the same or 2, 3 or 4 times higher than the flow through the dynamic main orifice A1-dyn. When the speed of rotation of the steering wheel (or any other steering command device) and accordingly the deflection between spool 26 and sleeve 27 is further increased, the main orifice A1 and the amplification orifice AU open and the dynamic drain orifice Adrain-dyn is closed. The main drain orifice Adrain is likewise closed. Thus, the hydraulic fluid supplied from the output CF of the priority valve 12 is completely supplied to the working port arrangement L, R, wherein part of this hydraulic flow is supplied via the main flow path A1 and measured by the measuring motor 3, wherein another part of the flow is supplied via the amplification flow path 6 without passing the measuring motor 3.

There is still a flow through a dynamic main orifice A1-dyn and through the dynamic amplification orifice AU-dyn.

Instead of a combination of a pump 10 having a fixed displacement and a priority valve 12 a pump having a variable displacement can be used as well as it produces a dynamic flow.

An overpressure valve 24 connects a load sensing line 25 to the tank. The load sensing line 25 connects the load sensing port 18 to the point 20, i.e. to the dynamic orifices A1-dyn, AU-dyn and Adrain-dyn, and comprises the load sensing orifice ALS.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a supply port arrangement having a pressure port and a tank port, a working port arrangement having two working ports, a main flow path having a main orifice and at least one further orifice downstream the main orifice, the main flow path being arranged between the pressure port and the working port arrangement, a return flow path arranged between the working port arrangement and the tank port, a measuring motor, an amplification flow path having an amplification orifice and being arranged between the pressure port and the working port arrangement, and an adjustable pressure source connected to the pressure port and having a load sensing port, wherein a main drain orifice is connected between the main flow path downstream the main orifice and the return flow path, wherein a dynamic main orifice is connected between the load sensing port and the main flow path downstream the main orifice, and a dynamic drain orifice is connected between the load sensing port and the return flow path, which dynamic drain orifice is open when the dynamic main orifice is closed.

2. The hydraulic steering arrangement according to claim 1, wherein the dynamic main orifice opens before the main orifice opens.

3. The hydraulic steering arrangement according to claim 2, wherein the dynamic main orifice is connected to the main flow path between the main orifice and a measuring motor orifice.

4. The hydraulic steering arrangement according to claim 2, wherein a dynamic amplification orifice is connected between the load sensing port and the main flow path downstream the measuring motor.

5. The hydraulic steering arrangement according to claim 1, characterized in that, wherein the dynamic main orifice is connected to the main flow path between the main orifice and a measuring motor orifice.

6. The hydraulic steering arrangement according to claim 5, wherein a dynamic amplification orifice is connected between the load sensing port and the main flow path downstream the measuring motor.

7. The hydraulic steering arrangement according to claim 1, wherein a dynamic amplification orifice is connected between the load sensing port and the main flow path downstream the measuring motor.

8. The hydraulic steering arrangement according to claim 7, wherein the dynamic amplification orifice opens before the amplification orifice opens.

9. The hydraulic steering arrangement according to claim 8, wherein a safety valve is arranged between the dynamic amplification orifice and the main flow path.

10. The hydraulic steering arrangement according to claim 8, wherein at least some of the orifices are formed by an arrangement of a spool and a sleeve, wherein the dynamic main orifice and the dynamic amplification orifice are connected by means of a ring channel arranged in the sleeve.

11. The hydraulic steering arrangement according to claim 7, wherein an opening degree of the dynamic main orifice is proportional to an opening degree of the dynamic amplification orifice.

12. The hydraulic steering arrangement according to claim 11, wherein a safety valve is arranged between the dynamic amplification orifice and the main flow path.

13. The hydraulic steering arrangement according to claim 11, wherein at least some of the orifices are formed by an arrangement of a spool and a sleeve, wherein the dynamic main orifice and the dynamic amplification orifice are connected by means of a ring channel arranged in the sleeve.

14. The hydraulic steering arrangement according to claim 7, wherein a safety valve is arranged between the dynamic amplification orifice and the main flow path.

15. The hydraulic steering arrangement according to claim 14, wherein at least some of the orifices are formed by an arrangement of a spool and a sleeve, wherein the dynamic main orifice and the dynamic amplification orifice are connected by means of a ring channel arranged in the sleeve.

16. The hydraulic steering arrangement according to claim 7, wherein at least some of the orifices are formed by an arrangement of a spool and a sleeve, wherein the dynamic main orifice and the dynamic amplification orifice are connected by means of a ring channel arranged in the sleeve.

17. The hydraulic steering arrangement according to claim 16, wherein the dynamic drain orifice is connected to the ring channel.

18. The hydraulic steering arrangement according to claim 1, wherein a relation between an opening degree of the main orifice and an opening degree of the amplification orifice changes with an actuation speed of a steering command device.

\* \* \* \* \*